United States Patent Office 3,217,017
Patented Nov. 9, 1965

3,217,017
CYCLOPENTADIENE HEXAAZIDE AND PROCESS
William L. Stepp, Chicago, Ill., assignor to the United States of America as represented by the Secretary of the Air Force
No Drawing. Filed Jan. 24, 1964, Ser. No. 340,111
5 Claims. (Cl. 260—349)

This invention relates to the hexaazide of cyclopentadiene and to the herein-described method by which it is made, for use as a special additive to propellants.

The objects of the present invention are to provide, the hexaazide of cyclopentadiene as a new and useful product, and the described method by which it is made.

Cyclopentadiene is represented herein by 1,3-cyclopentadiene of the formula

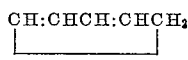

The azide group is represented by

of which sodium azide $NaN_3$ is representative. Tetrahydrofuran or tetramethylene oxide is represented by

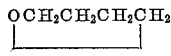

The cyclopentadiene hexaazide is believed to have the structure

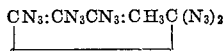

The process for making the product that is of interest here, begins with the weighing out of a charge and the placing of the charge in a reflux flask that is fitted with a stirrer, a heating mantle, and a reflux condensation temperature-controlling condenser.

The flask charge, illustratively, consists of 54.6 g. of hexachlorocyclopentadiene, 91 g. of sodium azide, 400 ml. of tetrahydrofuran and 110 ml. of water.

The stirrer is started, and after most of the sodium azide has dissolved, the application of heat to the flask is started.

The increase in the temperature of the stirred contents of the flask causes the flask contents to turn red gradually and to start refluxing. The refluxing, illustratively, is continued for 43 hours at just above the boiling point of the mixture.

At the end of the refluxing operation, the insoluble material that has formed in the flask is filtered off and is allowed to dry in the air.

The filtrate is concentrated by evaporation at room temperature and under a reduced pressure. The filtrate concentrating time is reduced with reduction in pressure below one atmosphere. The filtrate residue is a semisolid and is combined with the insoluble material that was previously filtered off.

The combined filtrate residue and insoluble material is then extracted, first with diethyl ether to remove the incompletely azidized materials and then with tetrahydrofuran to remove any residual charge.

The tetrahydrofuran extracted solution, at room temperature, is then evacuated at a pressure of 0.05 mm. mercury to yield a yellowish-brown solid. The yield, illustratively, is 16.4 g., which is equivalent by weight to a 26 percent yield of crude hexaazide product. The product may be heated to 200° C., at which temperature it decomposes slowly. At higher temperatures it explodes more or less violently.

The crude hexaazide product retained at room temperature and subjected to tests in the infrared spectrum, shows that the material contains azide groups ($N_3$), contains no chlorine, and that the carbon-to-carbon double bond structure ($C=C$) has been retained. These tests identify the product as cyclopentadiene hexaazide. The dissolution of the crude hexaazide in tetrahydrofuran and its reprecipitation by the addition of diethyl ether produces yellow crystals.

It is to be understood that the herein described cyclopentadiene hexaazide and the process by which it is made are successful reductions to practice of the present invention and that limited modifications may be made in the reactants, the proportions, the process steps, and the described apparatus without departing from the spirit and the scope of the present invention.

I claim:
1. Cyclopentadiene hexaazide.
2. The method for the preparation of cyclopentadiene hexaazide which comprises reacting hexachlorocyclopentadiene with sodium azide in an organic and inert solvent for the reactants.
3. The method defined by the claim 2 wherein the reaction is carried out by refluxing the reactants at a temperature slightly above the boiling point of the mixture.
4. The method defined by the claim 2 inclusive of filtering out the insoluble material prepared in the reaction, air drying the insoluble material, concentrating the filtrate by evaporation at room temperature under a reduced pressure to a semisolid residue, combining the insoluble material with the semisolid residue, extracting the combined material and residue with diethyl ether in removing incompletely azidized material, and extracting the residue with tetrahydrofuran to remove any residual charge, and purifying the product.
5. The process for making cyclopentadiene hexaazide by charging a reflux flask about in the proportion of 54.6 grams of hexachlorocyclopentadiene, 91 grams of sodium azide, 400 milliliters of tetrahydrofuran and 110 milliliters of water, refluxing the flask contents at just above its boiling point in accomplishing the reaction, filtering out the insoluble material of the flask contents, drying the filtrate at about room temperature, combining the insoluble material with the dried filtrate, and purifying the cyclopentadiene hexaazide so produced.

References Cited by the Examiner

Saxe et al., The George Washington Law Review, vol. 28, No. 3, March 1960, pages 616 to 641.

WALTER A. MODANCE, *Primary Examiner*.

CARL D. QUARFORTH, JOHN D. RANDOLPH,
*Examiners.*